United States Patent
Delgado et al.

(10) Patent No.: US 6,855,905 B2
(45) Date of Patent: Feb. 15, 2005

(54) FLEXIBLE WELDING TORCH HAVING RESTRAINING MEMBER TO AVOID OVEREXTENSION AND METHOD OF ASSEMBLING SAME

(75) Inventors: David Delgado, Rancho Cucamonga, CA (US); Fred Stecher, Buena Park, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/146,994

(22) Filed: May 16, 2002

(65) Prior Publication Data

US 2003/0213778 A1 Nov. 20, 2003

(51) Int. Cl.[7] .................................................. B23K 9/00
(52) U.S. Cl. ................ 219/74; 219/137.31; 219/137.51
(58) Field of Search ....................... 219/74, 75, 137.31, 219/137.51; 138/129, 130, 131, 132, 133, 134, 135, 136

(56) References Cited

U.S. PATENT DOCUMENTS

| | | | | |
|---|---|---|---|---|
| 3,402,741 A | * | 9/1968 | Yurdin ........................ 138/118 |
| 3,703,622 A | * | 11/1972 | Kleppen, Jr. .................. 219/75 |
| 3,739,770 A | * | 6/1973 | Mori ........................... 600/139 |
| 3,909,585 A | * | 9/1975 | Sanders et al. ......... 219/137.51 |
| 4,145,595 A | * | 3/1979 | Keller et al. ................... 219/75 |
| 5,166,496 A | * | 11/1992 | Sarkissian .............. 219/137.51 |

* cited by examiner

Primary Examiner—Kiley S. Stoner
Assistant Examiner—Len Tran
(74) Attorney, Agent, or Firm—Fletcher Yoder

(57) ABSTRACT

A positionable welding torch for a welding system is featured. The torch comprises a torch head, a handle, and a flexible portion coupled to the torch head and the handle. The flexible portion is adapted to enable the torch head to be positioned relative to the handle. The flexible portion has a first end, a second end, and a rigid restraining member adapted to cooperate with the first and second ends to limit the relative displacement of the first and second ends. The restraining member may comprise a restraining portion adapted to abut one of the first and second end portions. The restraining member also may comprise a biasing portion adapted to bias the restraining portion into engagement with one of the first and second end portions. A method for assembling a welding torch having a restraining member also is featured.

27 Claims, 3 Drawing Sheets

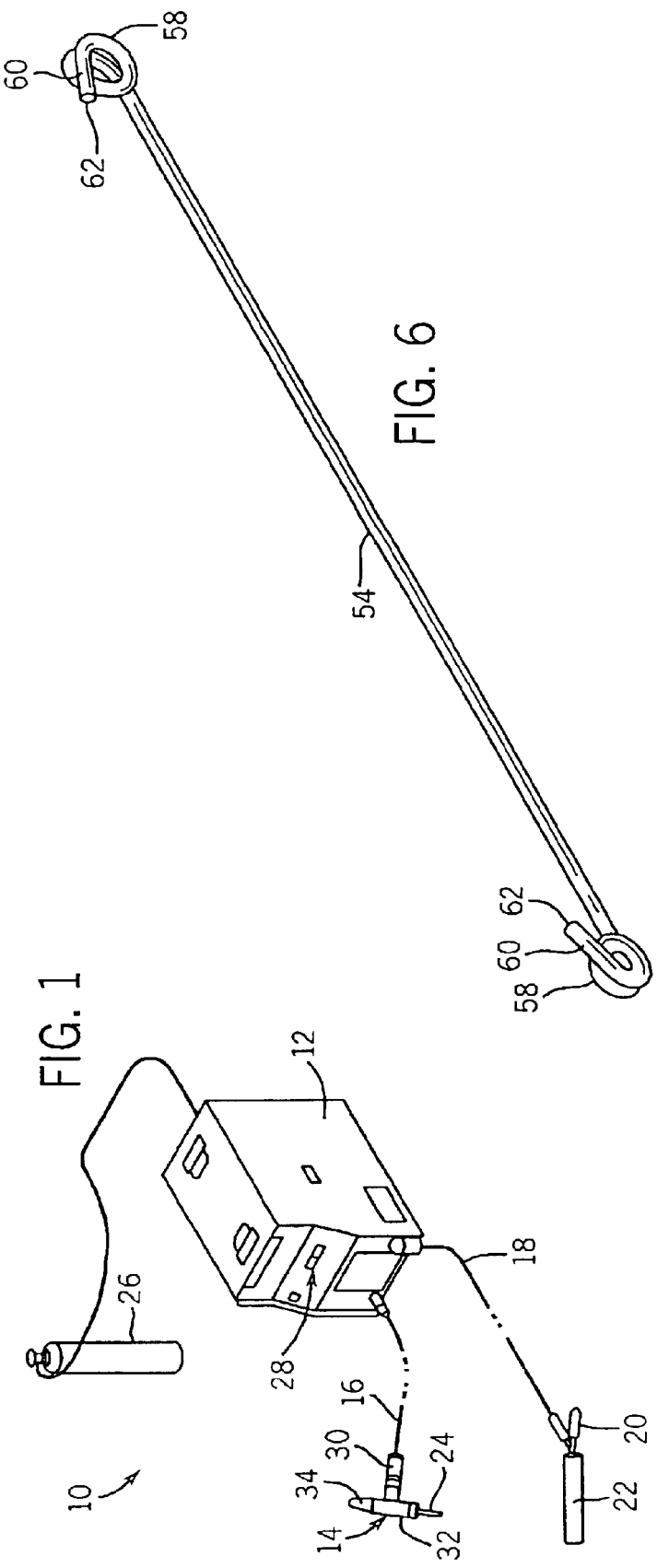
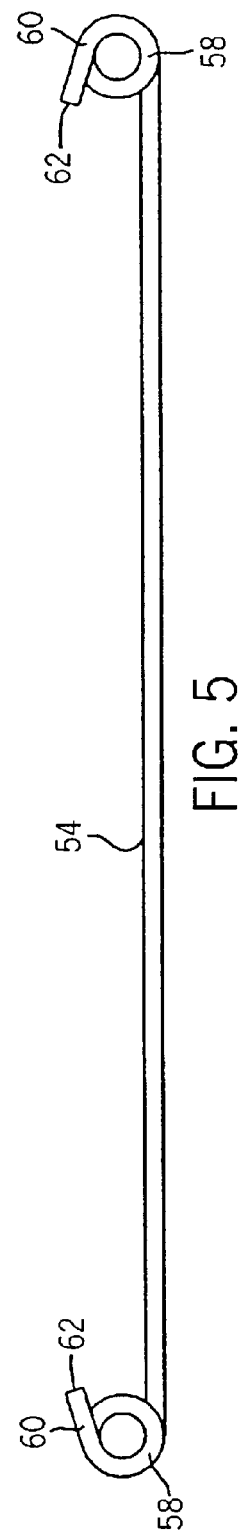

FLEXIBLE WELDING TORCH HAVING RESTRAINING MEMBER TO AVOID OVEREXTENSION AND METHOD OF ASSEMBLING SAME

BACKGROUND OF THE INVENTION

The present invention relates generally to the field of arc welding systems, and more particularly to an arc welding torch having a flexible handle and a method of assembly thereof.

TIG (Tungsten Inert Gas) welding (also known as gas tungsten arc welding, GTAW, or HELIARC) is a type of welding process in which heat generated from an electric arc is maintained between a non-consumable tungsten electrode and the object being welded. The electrode is secured to a torch to enable a user to direct the electrode. TIG welding may be performed with or without the addition of a filler metal. A wire can be fed into the weld puddle when filler material is desired. The weld puddle and the area surrounding the weld puddle are protected from the atmosphere by an inert gas. The inert gas prevents rapid oxidation of the weld and the surrounding metal.

The electricity for the welding process is provided by a power source through a welding cable coupled to the torch. Typically, the power source is constant current AC, DC, or a combination AC/DC source. In addition, a TIG welding cable typically is adapted to transport the inert gas to the torch. Furthermore, the TIG welding process typically generates a substantial amount of heat. Consequently, cooling fluid may be used to cool the torch. Thus, a welding cable for a TIG welding system may transport electricity, gas, and cooling fluid.

A TIG welding torch typically has a torch head and a handle. The electrode is held by the torch head. The handle, in turn, is gripped by a user to direct the electrode towards a workpiece. In many torches, the positions of the torch head and handle are fixed. However, there are torches that enable a user to position the torch head relative to the handle.

A typical positionable torch has a coil assembly that is used to couple the torch head to the torch handle. The coils of the coil assembly are flexible to enable the torch head to be angled relative to the handle. A restraining assembly may used to prevent the coil from overstretching. A typical restraining assembly is a piano wire strung between two dowel pins located at each end of the coil assembly. When the coil is stretched to the point that the piano wire goes taught, the ends of the coil assembly are prevented from further displacement, limiting the stretching of the coil. Typically, the piano wire is inserted through a hole in one of the dowel pins and then wrapped around the pin to secure the wire to the pin. The other end of the piano wire is then inserted through the coil assembly to a dowel pin located at the opposite end of the coil assembly. The wire is inserted through a hole in the second dowel pin and wrapped around the second pin to secure the piano wire to the dowel pin.

The above-described process for installing the restraining wire to the coil assembly is very time consuming, especially the process of inserting a wire through a small hole in the dowel pin and securing the wire to the dowel pin. A need exists for a technique to prevent the coil assembly of a positionable torch from overstretching, but which is less time consuming to assemble than conventional methods. More specifically, a need exists for a restraining device that does not utilize piano wire secured to a dowel pin through a hole in the dowel pin.

SUMMARY OF THE INVENTION

The present technique features a positionable torch for a welding system. The torch comprises a torch head, a handle, and a flexible portion coupled to the torch head and the handle. The flexible portion is adapted to enable the torch head to be positioned relative to the handle. The flexible portion has a first end, a second end, and a rigid restraining member adapted to cooperate with the first and second ends to limit the relative displacement of the first and second ends. The restraining member may comprise a restraining portion adapted to abut one of the first and second end portions. The restraining member also may comprise a biasing portion adapted to bias the restraining portion into engagement with one of the first and second end portions.

The present technique also features a method of installing a restraining member in a coil assembly of a welding torch. The method comprises disposing a restraining member into a passageway through an end member of the coil assembly. The method also comprises directing the restraining member through the passageway to a second portion of the passageway, whereupon the restraining member expands, preventing the restraining member from being drawn back through the passageway.

BRIEF DESCRIPTION OF THE DRAWINGS

The foregoing and other advantages and features of the invention will become apparent upon reading the following detailed description and upon reference to the drawings in which:

FIG. 1 is a TIG welding system, according to an exemplary embodiment of the present technique;

FIG. 5 is an elevational view of a restraining member, according to an exemplary embodiment of the present technique;

FIG. 6 is a perspective view of a restraining member, according to an exemplary embodiment of the present technique;

DETAILED DESCRIPTION OF SPECIFIC EMBODIMENTS

Figure 2:
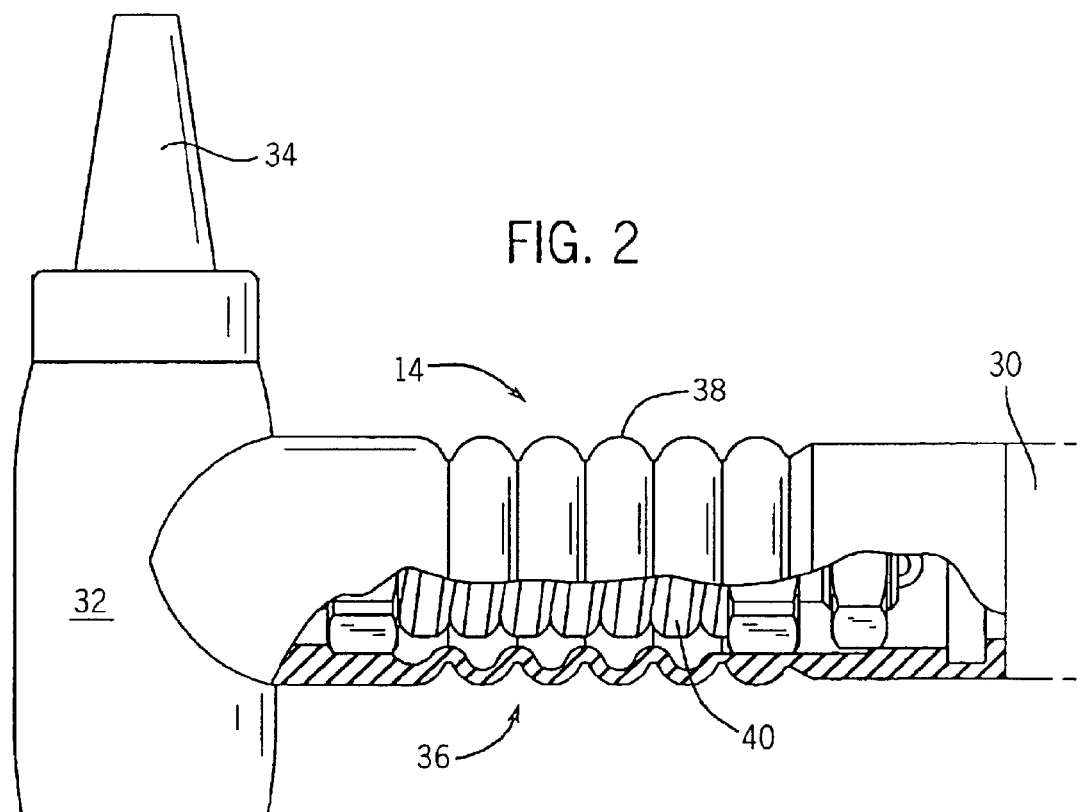
FIG. 2 is a positionable welding torch positioned in a first position, according to an exemplary embodiment of the present technique.

Referring generally to FIG. 1, a TIG welding system is illustrated, as represented generally by reference numeral 10. The TIG welding system 10 comprises a power supply 12, a TIG welding torch 14, a welding cable 16, and a return cable 18. The power supply 12 may be a constant current AC, DC, a combination AC/DC source, or some other type of power supply. The welding cable 16 electrically couples the welding torch 14 to one terminal of the power supply 12.

The return cable 18 is coupled to a second terminal of the power supply 12. In the illustrated embodiment, the return cable 18 has a clamp 20 that is adapted to secure and electrically couple the return cable 18 to a workpiece 22 to be welded. The welding torch 14 is adapted to receive an electrode 24. When the electrode 24 touches the material 22 to be welded, an electric circuit is completed from one terminal of the power supply 12, through the welding cable 16, the electrode 24, the work clamp 20, and the return cable 18 to a second terminal of the power supply 12.

In the illustrated embodiment, in addition to electricity, gas from a gas source is coupled to the torch 14. In the illustrated embodiment, the gas source is a gas cylinder 26 coupled to the power supply 12. In the illustrated embodiment, the gas is coupled from the power supply 12 to the torch 14 through the welding cable 16. In this embodiment, the power supply 12 has numerous controls 28 to enable a user to control various operating parameters of the power supply 12, such as the output voltage.

In the illustrated embodiment, the welding torch 14 has a handle 30 that is adapted to receive the welding cable 16. The handle 30 also is adapted to be held by a user to direct the operation of the torch 14. The welding torch 14 also has a torch head 32 that is adapted to hold the electrode 24 and direct the inert gas towards the target material 22. In this embodiment, the torch 14 also has a back cap 34 to seal the end of the torch head 32 opposite the electrode so that the gas does not leak out of the torch head 32. A long back cap may be used to enable the torch head to receive long electrodes, while still maintaining a gas seal.

Figure 3:
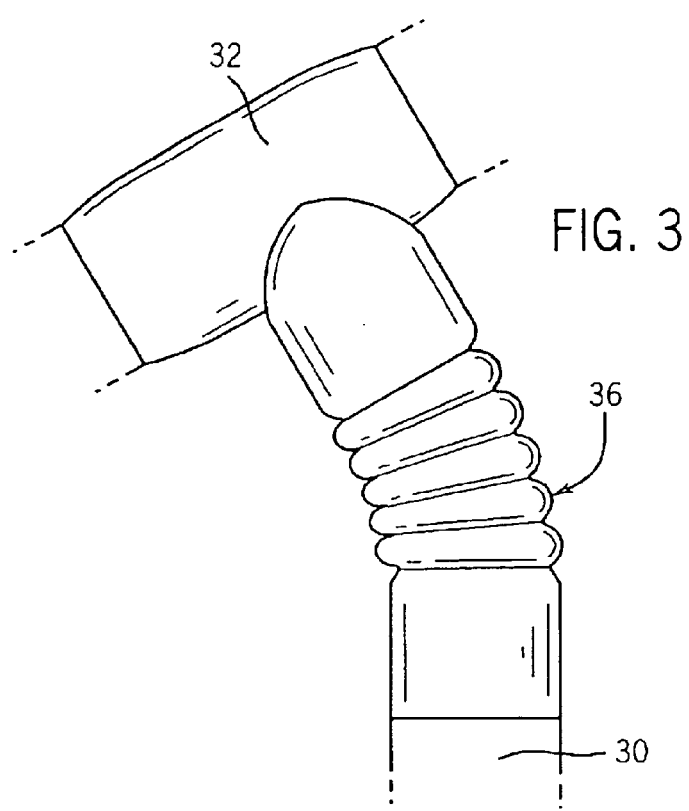
FIG. 3 is the positionable torch of FIG. 2 positioned in a second position, according to an exemplary embodiment of the present technique.

Referring generally to FIGS. 2 and 3, the illustrated torch 14 is flexible to enable the torch head 32 and, thus, electrode 24 to be positioned relative to the handle 30. The torch head 32 and handle 30 are aligned linearly in FIG. 2. The torch head 32 is angled relative to the handle 30 in FIG. 3. In the illustrated embodiment, the welding torch 14 has a coil assembly 36 disposed between the handle 30 and torch head 32. The coil assembly 36 is positionable to enable the torch head 32 to be positioned relative to the handle 30. Once positioned, the coil assembly 36 maintains its shape until repositioned. In the illustrated embodiment, a protective cover 38 is disposed over the coil assembly 36. Preferably, the protective cover 38 is composed of an electrically insulating material, such as rubber.

Figure 4:
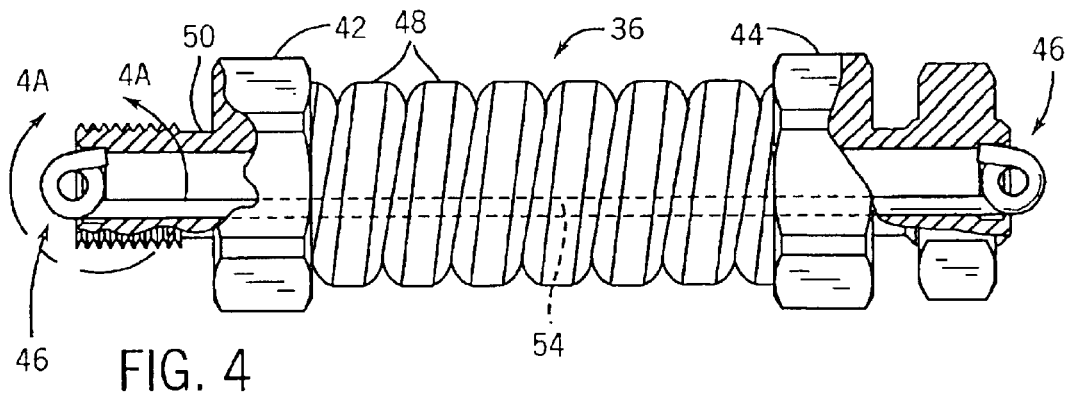
FIG. 4 is a coil assembly for a positionable torch, according to an exemplary embodiment of the present technique.

As best illustrated in FIG. 4, the coil assembly 36 comprises a coil 40, a first end piece 42, a second end piece 44, and a restraining member 46. The coil 40 has a series of turns 48 that couple the first and second end pieces. The coil 40 may be adapted in a variety of configurations and is not limited to a single coil. For example, the coil 40 may comprise a plurality of coils. In this embodiment, the coil 40 is comprised of an electrically conductive material and is adapted to conduct electricity from the welding cable 16 to the torch head 32. Gas flows from the welding cable 16 to the torch head 32 through the center of the coil 40. The coil 40 enables the first end piece 42 to be angled relative to the second end piece 44. Additionally, the end pieces and restraining member 46 are operable to hold the coil 40 in compression. The coil 40 may be secured to each end piece by welding, for example, or secured to each end piece by the restraining member 46. Preferably, the coil 40 is plastically deformable to enable the end pieces to remain in a desired position. In the illustrated embodiment, the coil assembly 36 is adapted to enable the coil 40 to stretch, but not overstretch. Pulling the handle 30 and torch head 32 apart causes the coil 40 to stretch. In addition, bending the coil 40 to angle the torch head 32 relative to the handle 30 may cause the coil 40 to stretch, as well. The restraining wire 46 is adapted to limit the amount of stretch of the coil 40 to prevent damage to the coil 40 from overstretching.

Figure 4A:
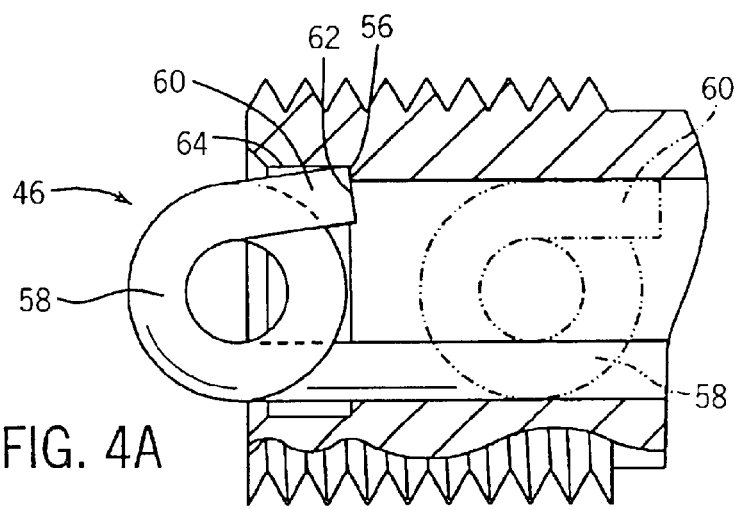
FIG. 4A is a detailed view of the coil assembly of FIG. 4 taken generally along line 4A—4A of FIG. 4.

Referring generally to FIGS. 4 and 4A, each end piece has a passageway 50 therethrough. Preferably, the restraining member 46 is disposed of spring wire. Spring wire is plastically deformable so that it will retain its shape when manipulated. The restraining member 46 has two end portions 52 that are connected by a connecting portion 54 that extends from one end piece to the other through the center of the coil 40. Each end 52 is adapted to contact a lip 56 within the passageway 50 of each end piece. As best illustrated in FIGS. 5 and 6, each end 52 has a loop portion 58 and an end portion 60. In the illustrated embodiment, each end portion 60 is adapted to abut the lip 56. In addition, each loop portion 58 of the illustrated embodiment is a portion of the restraining member 46 that has been worked to have approximately one and one-half loops. In addition, in this embodiment each end portion 60 is a straight section of wire extending from the loop portion 58 and having an end surface 62 that is flat. However, the end portion 60 may be curved, or otherwise adapted with a non-straight configuration. Also, the end surface 62 may have an angled surface, or other configuration adapted for abutting the lip 56. In this embodiment, the loop portion 58 also serves to direct the end portion 60 into engagement with the interior surface 64 of the passageway.

Referring again to FIGS. 4 and 4A, to assemble the coil assembly, one end of the restraining member 46 is inserted through the passageway 50 through one of the end pieces. Note that the process of installing the restraining member 46 may be initiated from either end of the coil assembly in this embodiment. The end portion 60 being inserted into the passageway is displaced from its initial angled orientation to fit into the passageway 50, as represented by the dashed line in FIG. 4A. The loop portion 58 of the restraining member 46 also acts as a spring member to bias the end portion 60 back towards its initial orientation once the end portion 60 is clear of the passageway 50. The loop portion 58 is compressed when the end portion 60 is inserted into the passageway 50. Once the end portion 60 is inserted through the first of the two end members, the restraining member 46 is inserted through the center of the coil and into the passageway 50 of the next end member. Once again, the loop portion 58 is compressed as the end portion is inserted into the passageway 50 of another end piece. When the end portion 60 is clear of the lip 56, the loop portion 58 biases the end portion 60 outward against the interior surface 64 of the end piece. The lip 56 prevents the restraining member 46 from being withdrawn back through the passageway 50 by blocking the end surface 62 of the end portion 60. The end portion 60 at the opposite end of the restraining member 46 also is biased against the interior surface 64 of the opposite end piece. The end portion 60 at the opposite end is prevented from being drawn into the passageway 50 by its end surface 62 acting on the lip 56 of its respective end member. Thus, the coil assembly 36 is constrained by the two end surfaces 62 of the restraining member 46. During assembly, an external apparatus may be used to compress the coil and end pieces to assist in inserting the restraining member 46.

Figure 7:
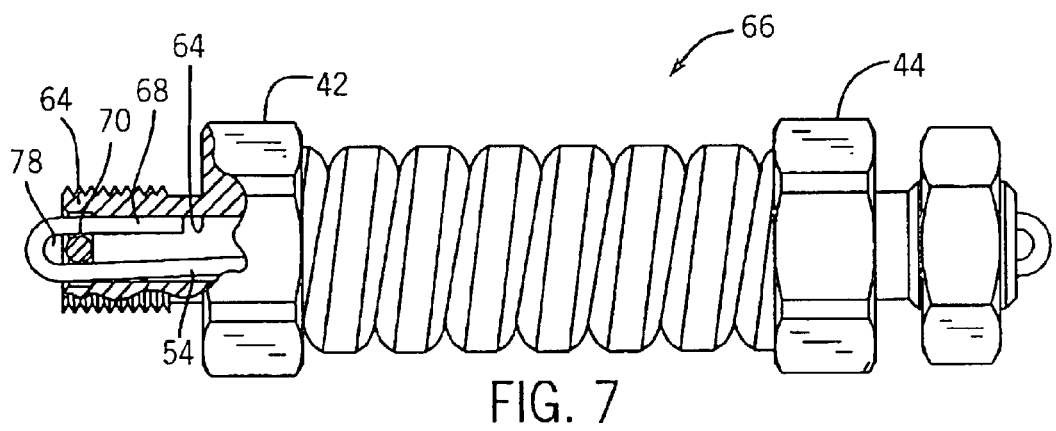
FIG. 7 is an alternative embodiment of a coil assembly, according to an exemplary embodiment of the present technique.
Figure 8:
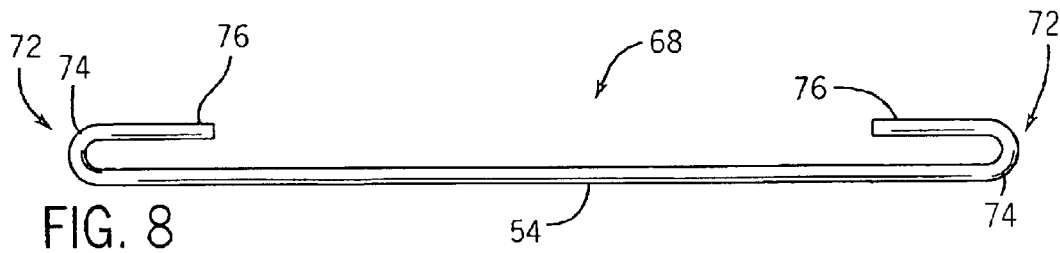
FIG. 8 is an alternative embodiment of a restraining member, according to an exemplary embodiment of the present technique.

Referring generally to FIGS. 7 and 8, an alternative embodiment of a coil assembly 66 and restraining member 68 are illustrated. In the illustrated embodiment, the second coil assembly 66 utilizes the same coil 40 and end pieces 42 and 44 as the first coil assembly 36. However, the second embodiment may utilize other configurations of the coil and end pieces. In the illustrated embodiment, the restraining member 68 is adapted to cooperate with a pin 70 disposed within each of the first and second end pieces 42 and 44. In this embodiment, the pins 70 abut the lip 56 of the end pieces, not the restraining member 68, to constrain the displacement of the end pieces. In this embodiment, each end portion 72 of the restraining member 68 has a curved portion 74 and a straight end portion 76. The curved portions 74 are adapted to contact one of the pins 70 that is located in each end piece to limit the stretch of the coil 40. In addition, the curved portion 74 biases the straight end portions 76 against the interior 64 of the end piece to hold the restraining member in position within the end pieces. The restraining member 68 is adapted to enable the coil 40 length to vary a defined amount. In the illustrated embodiment, the coil 40 is shown less than fully extended. In this embodiment, each pin 70 is able to travel a defined distance within a gap 78 formed between the straight end portion 76 and the connecting portion 54. Preferably, the restraining member 68 is made of spring wire also.

Similarly to the process previously described above, one end portion 72 of the restraining member 68 is inserted through the passageway 50 through one of the end pieces to assemble the coil assembly 66. Note that in this embodiment also, the process of installing the restraining member 46 may be initiated from either end of the coil assembly. In this embodiment, the straight end portion 76 may be displaced from its initial orientation to fit into the passageway 50. The curved portion 74 of the restraining member 68 may also act as a spring member to bias the straight end portion 76 back towards its initial orientation once the straight end portion 76 is clear of the passageway 50. The restraining member 68 is inserted through the center of the coil and into the passageway 50 of the next end member. When the curved portion 74 is clear of the end of the end member, one of the pins 70 is inserted in the gap 78 between the straight end portion 76 and the connecting portion 54. Similarly, a second pin may be disposed between the curved portion 74 and end member located at the opposite end of the restraining member 68. During assembly, the coil 40 may be compressed between the end pieces to facilitate the assembly process. The coil may then be released and allowed to expand. However, the curved portions 74 at each end of the restraining member act on the respective pins 70 located in each end piece to limit the expansion of the coil.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, a restraining member may embody features of each of the above-described embodiments, according to the present technique. A restraining member may have a looped end portion 58 at one end with the curved end portion 74 and pin 70 arrangement at the opposite end. In addition, the second coil assembly 66 may be adapted so that the straight end portion 76 of the second restraining member 68 abuts the lip 56 of a coil end member 42 and 44, rather than a pin 70. In addition, the positionable welding torch and restraining member may be used in welding systems, other than TIG welding systems.

What is claimed is:

1. A torch for a TIG welding system, comprising:
   a torch head;
   a torch handle; and
   an assembly to enable the torch head to be positioned relative to the torch handle, the assembly comprising:
      a coil;
      a first end member coupled to a first end of the coil;
      a second end member coupled to a second end of the coil; and
      a restraining member adapted to limit relative displacement of the first and second end members, the restraining member comprising:
         at least one end portion adapted to abut one of the first and second end members; and
         a coiled portion adapted to bias the at least one end portion outward into engagement with one of the first and second end members.

2. The torch as recited in claim 1, wherein the restraining member has a second end portion opposite the first end portion, the second end portion comprising a second coiled portion adapted to bias the second end portion outward into engagement with one of the first and second end members.

3. The torch as recited in claim 1, wherein the restraining member is rigid.

4. The torch as recited in claim 1, wherein the restraining member is plastically deformable.

5. The torch as recited in claim 1, wherein the at least one end portion comprises an abutment portion adapted to abut an interior surface within one of the first and second coil end members.

6. A welding torch for a welding system, comprising:
   a torch head;
   a handle; and
   a flexible portion coupled to the torch head and the handle, the flexible portion being adapted to enable the torch head to be positioned relative to the handle, the flexible portion comprising:
      a first end member and a second end member; and
      a restraining member adapted to cooperate with the first and second end members to limit relative displacement of the first and second end members, the restraining member comprising:
         a restraining portion disposed at each end of the restraining member, wherein the restraining portions are adapted to capture the first and second end members therebetween; and
         a coiled portion disposed adjacent to each restraining portion, wherein each coiled portion is adapted to bias an adjacent restraining portion outward into engagement with one of the first and second end members.

7. The torch as recited in claim 6, wherein the restraining member is a rigid, plastically deformable wire.

8. The torch as recited in claim 7, wherein the at least one biasing portion is a coil formed in the wire.

9. The torch as recited in claim 7, wherein the at least one restraining portion is an end of the wire.

10. The torch as recited in claim 6, wherein at least one of the first and second end portions is adapted for abutment with the at least one restraining portion.

11. A welding torch for a welding system, comprising:
    a torch head operable to hold a welding electrode;
    a handle; and
    a flexible portion coupled to the torch head and the handle, the flexible portion being adapted to enable the torch head to be positioned relative to the handle, the flexible portion comprising:

a first end member and a second end member; and a restraining member adapted to cooperate with the first and second end members to limit relative displacement of the first and second end members, wherein the restraining member comprises a compressible portion operable to compress as the compressible portion is disposed through at least one end member and to expand outward to engage the at least one end member when the compressible portion is disposed through the at least one end member.

12. A welding torch for a welding system, comprising:

a torch head operable to hold a welding electrode;

a handle; and a flexible portion coupled to the torch head and the handle, the flexible portion being adapted to enable the torch head to be positioned relative to the handle, the flexible portion comprising:

a first end member;

a second end member;

a coil disposed intermediate the first and second end members; and a plastically deformable restraining member adapted to extend through the first end member, the coil, and the second end member to limit expansion of the coil by limiting relative displacement of the first and second end members, wherein the plastically deformable restraining member engages the first and second end members by abutment.

13. A torch for a welding system, comprising:

a torch head;

a handle; and a coil assembly enabling the torch head to be positioned relative to the handle, comprising:

a coil having a first and a second end;

a first pin coupled to the first end of the coil; and a restraining member adapted to prevent overstretching of the coil, the restraining member having a first curved end portion adapted to engage the first pin at a defined displacement of the first end and second end of the coil.

14. The torch as recited in claim 13, comprising a first end member adapted to control expansion of the coil, wherein the first pin is coupled to the first end of the coil by the first end member.

15. The torch as recited in claim 13, comprising a second pin coupled to the second end of the coil, wherein the restraining member has a second curved portion adapted to engage the second pin to limit the first end and second end of the coil to a defined displacement.

16. A welding torch, comprising:

a bendable portion adapted to enable a torch head to be positioned relative to a torch handle, comprising:

a coil;

a first member disposed at a first end of the coil;

a second member disposed at a second end of the coil; and a restraining member adapted to limit extension of the coil by capturing the first and second end members therebetween, the retraining member comprising a wire having a coil wound adjacent to each end of the wire to bias each end of the wire outward.

17. The welding torch as recited in claim 16, wherein at least one of the first end member and second end member abuts the coil.

18. The welding torch as recited in claim 16, wherein at least one of the first end member and second end member is secured to the coil.

19. The welding torch as recited in claim 16, wherein each end of the wire is adapted to abut one of the first end member and the second end member.

20. The welding torch as recited in claim 19, wherein each coil wound adjacent to an end of the wire is adapted to enable the end to be compressed as the end is disposed through a first portion of the first end member and to expand outward as the first end portion is disposed through a second portion of the first end member.

21. The welding torch as recited in claim 16, wherein the restraining member comprises metal.

22. The welding torch as recited in claim 16, comprising the torch head.

23. The welding torch as recited in claim 16, comprising the torch handle.

24. A welding torch, comprising:

a coil spring;

a first end portion and a second end portion adapted to capture the coil spring therebetween; and a retaining member adapted to limit extension of the coil spring, wherein a first end of the retaining member is adapted to be disposed through the first end portion and to expand outward to prevent the retaining member from being withdrawn through the first end portion.

25. The welding torch as recited in claim 24, wherein the first end of the retaining member comprises a coiled portion adapted to be twisted into a tighter coil by the first end portion as the coiled portion is disposed through the first end portion and to untwist to expand outward when the coiled portion is disposed through the first end portion.

26. The welding torch as recited in claim 24, wherein the retaining member comprises a second end portion adapted to prevent the retaining member from being drawn through the second end portion.

27. The welding torch as recited in claim 26, wherein the second end of the retaining member comprises a coiled portion adapted to abut the second end portion.

* * * * *